(12) United States Patent
Hammerum et al.

(10) Patent No.: US 11,754,043 B2
(45) Date of Patent: Sep. 12, 2023

(54) METHOD AND SYSTEM FOR CONTROLLING A WIND TURBINE TO REDUCE NACELLE VIBRATION

(71) Applicant: VESTAS WIND SYSTEMS A/S, Aarhus N (DK)

(72) Inventors: Keld Hammerum, Hadsten (DK); Jesper Sandberg Thomsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/056,395

(22) PCT Filed: May 8, 2019

(86) PCT No.: PCT/DK2019/050146
§ 371 (c)(1),
(2) Date: Nov. 17, 2020

(87) PCT Pub. No.: WO2019/219137
PCT Pub. Date: Nov. 21, 2019

(65) Prior Publication Data
US 2021/0207584 A1 Jul. 8, 2021

(30) Foreign Application Priority Data
May 17, 2018 (DK) .......................... PA 2018 70303

(51) Int. Cl.
*F03D 7/02* (2006.01)
*F03D 7/04* (2006.01)

(52) U.S. Cl.
CPC ......... *F03D 7/0296* (2013.01); *F03D 7/0224* (2013.01); *F03D 7/042* (2013.01);
(Continued)

(58) Field of Classification Search
None
See application file for complete search history.

(56) References Cited

U.S. PATENT DOCUMENTS

| 11,215,163 | B2 * | 1/2022 | Caponetti | ............. | F03D 7/0224 |
| 2008/0206051 | A1 * | 8/2008 | Wakasa | ................ | F03D 7/0296 |
| | | | | | 416/41 |

(Continued)

FOREIGN PATENT DOCUMENTS

| DK | 201470481 A1 | 8/2015 |
| EP | 2963283 A1 | 1/2016 |

(Continued)

OTHER PUBLICATIONS

Danish Patent and Trademark Office Search Report for Application No. PA 2018 70303 dated Feb. 27, 2019.
(Continued)

*Primary Examiner* — Juan G Flores
(74) *Attorney, Agent, or Firm* — Patterson + Sheridan, LLP

(57) ABSTRACT

Controlling a wind turbine by obtaining a movement signal indicative of a vibrational movement of a wind turbine tower is described. An actuator signal is determined based on the movement signal, the actuator signal being determined to produce a desired force to counteract the vibrational movement of the tower. A pitch reference offset signal for each one of a plurality of pitch-adjustable rotor blades is determined based on the actuator signal. An integration is then applied to the pitch reference offset signals to determine modified pitch reference offset signals based on the integrated pitch reference offset signals. A pitch signal for each of the blades is determined based on the modified pitch reference offset signals, the pitch signals being arranged to adjust the blades to provide the force that counteracts the vibrational movement of the tower.

14 Claims, 8 Drawing Sheets

(52) U.S. Cl.
CPC ..... *F05B 2240/21* (2013.01); *F05B 2270/328* (2013.01); *F05B 2270/334* (2013.01); *F05B 2270/404* (2013.01)

(56) References Cited

U.S. PATENT DOCUMENTS

| | | |
|---|---|---|
| 2010/0111693 A1 | 5/2010 | Wilson |
| 2013/0230396 A1 | 9/2013 | Wakasa et al. |
| 2016/0356266 A1* | 12/2016 | Koerber ................ F03D 7/0224 |
| 2016/0377057 A1 | 12/2016 | Caponetti et al. |
| 2018/0017042 A1 | 1/2018 | Baun et al. |

FOREIGN PATENT DOCUMENTS

| | | |
|---|---|---|
| WO | 2019042515 A1 | 3/2019 |
| WO | 2019219137 A1 | 11/2019 |

OTHER PUBLICATIONS

Danish Patent and Trademark Office 1st Technical Examination for Application No. PA 2018 70303 dated Mar. 1, 2019.

PCT International Search Report for Application PCT/US2019/050146 dated Dec. 8, 2019.

Van Solingen E et al: "Control Design for a two-bladed downwind teeterless damped free-yaw wind turbine," Mechatronics, Pergamon Press, Oxford, GB, vol. 36, May 8, 2016, pp. 77-96.

PCT Written Opinion of the International Searching Authority for Application No. PCT/DK2019/050146 dated Dec. 8, 2019.

\* cited by examiner

METHOD AND SYSTEM FOR CONTROLLING A WIND TURBINE TO REDUCE NACELLE VIBRATION

FIELD OF THE INVENTION

This invention relates to the control of a wind turbine to reduce nacelle vibration.

BACKGROUND

Wind turbines as known in the art comprise a tower supporting a nacelle and a rotor with a number of pitch-adjustable rotor blades. Such wind turbines are prone to vibrations since they comprise a large mass positioned at the end of a slender tower. For this reason, a key requirement for controlling the vibrational behaviour of such wind turbines is to prevent any exciting rotor forces, produced from imbalances in the rotor, from resonating with the natural bending frequencies of the tower. Preventing any critical exciting rotor forces from coinciding with the natural bending frequencies of the tower imposes frequency constraints on the design of wind turbines.

It is against this background that the invention has been devised.

STATEMENTS OF INVENTION

According to a first aspect of the invention, there is provided a method of controlling a wind turbine comprising a tower supporting a rotor comprising a plurality of pitch-adjustable rotor blades, the method comprising: obtaining a movement signal indicative of a vibrational movement of the tower; determining an actuator signal based on the movement signal, the actuator signal being determined to produce a desired force to counteract the vibrational movement of the tower; determining a pitch reference offset signal for each one of the plurality of pitch-adjustable rotor blades based on the actuator signal: applying an integration of the pitch reference offset signals; determining modified pitch reference offset signals based on the integrated pitch reference offset signals; and, determining a pitch signal for each one of the plurality of pitch-adjustable rotor blades based on the modified pitch reference offset signals, the pitch signals being arranged to adjust the pitch-adjustable rotor blades to provide the force that counteracts the vibrational movement of the tower.

Preferably, the method further comprising applying an adjustment gain to the pitch reference offset signals and determining the modified pitch reference offset signals based on the integrated pitch reference offset signals and the gain adjusted pitch reference offset signals.

Preferably, the method further comprises obtaining a velocity signal based on the movement signal, the velocity signal indicative of a velocity of the top of the tower during the vibrational movement of the tower; determining a second signal based on the velocity signal; applying an adjustment gain to the second signal; and, determining the actuator signal based on the gain adjusted first signal and the gain adjusted second signal.

Preferably, the method further comprises obtaining a position signal based on the movement signal, the position signal indicative of a position of the top of the tower during the vibrational movement of the tower; determining a first signal based on the position signal; applying an adjustment gain to the first signal; and, determining the actuator signal based on the gain adjusted first signal.

Preferably, the movement signal comprises an acceleration signal, and the method further comprises obtaining the velocity signal as an estimated velocity signal by applying a first integration of the acceleration signal; and, obtaining the position signal as an estimated position signal by applying a second integration of the velocity signal.

Preferably, the actuator signal is determined in a non-rotating reference frame, and the method further comprises transforming the actuator signal from the non-rotating reference frame to a rotating reference frame to determine the pitch reference offset signals.

Preferably, the method further comprises determining a collective pitch reference signal for the pitch-adjustable rotor blades, the collective pitch reference signal being determined based on a rotor speed, wherein the pitch signals are determined based on a combined signal of the modified pitch reference offset signals and the collective pitch reference signal.

Preferably, the collective pitch reference is determined by feedback control based on minimising a speed error between the rotor speed and a reference rotor speed.

Preferably, the method further comprises determining an excitation frequency affecting the tower, wherein the adjustment gain is defined by a separation between the excitation frequency and a tower vibration frequency.

Preferably, the adjustment gain further comprises a gain scheduling term, the gain scheduling term being dependent on an operational point of the wind turbine.

Preferably, the direction of the vibrational movement of the tower is a lateral direction or a torsional direction.

According to a second aspect of the invention, there is provided a controller for a wind turbine control system comprising a processor and a memory module, wherein the memory module comprises a set of program code instructions which when executed by the processor implement a method according to the first aspect of the invention.

According to a third aspect of the invention, there is provided a wind turbine comprising a tower supporting a rotor comprising a plurality of pitch-adjustable rotor blades and a controller according to the second aspect of the invention.

According to a fourth aspect of the invention, there is provided a computer program product downloadable from a communication network and/or stored on a machine readable medium comprising program code instructions for implementing a method according to the first aspect of the invention.

BRIEF DESCRIPTION OF THE DRAWINGS

The above and other aspects of the invention will now be described, by way of example only, with reference to the accompanying drawings, in which.

Figure 1:
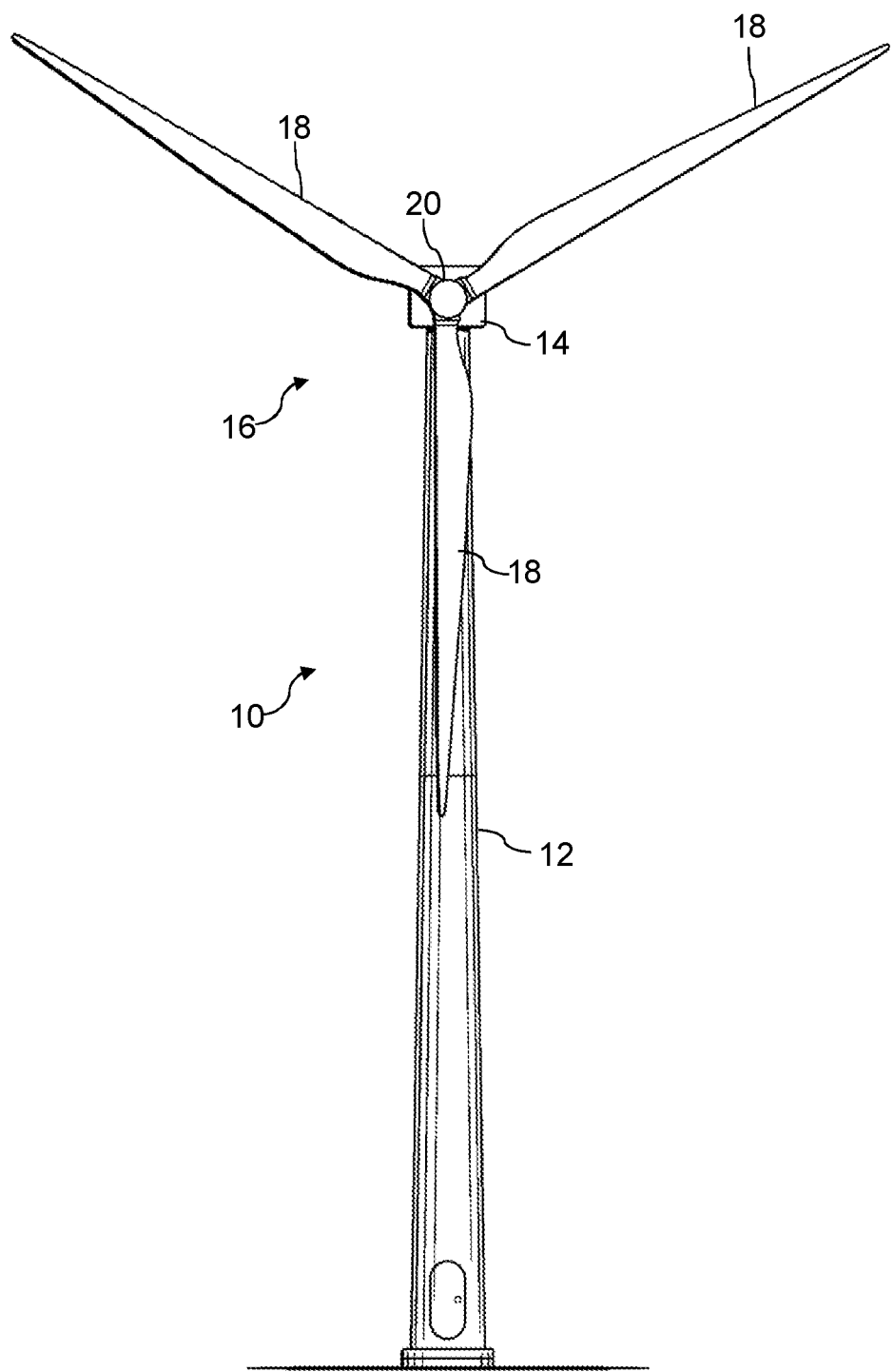
FIG. 1 is a schematic view of a wind turbine according to an embodiment of the invention.

In the drawings, like features are denoted by like reference signs.

SPECIFIC DESCRIPTION

FIG. 1 shows a wind turbine, generally designated as 10, comprising a tower 12. The tower 12 supports a nacelle 14 to which a rotor 16 is mounted. The rotor 16 is operatively coupled to a generator housed inside the nacelle 14. In addition to the generator, the nacelle 14 houses miscellaneous components required for converting wind energy into electrical energy, along with various other components needed to operate, control, and optimise the performance of the wind turbine 10. The rotor 16 comprises a plurality of rotor blades 18 extending radially from a central hub 20. In this example, the rotor 16 comprises three rotor blades 18, although it will be apparent to those skilled in the art that other configurations are possible. The rotor blades 18 are pitch-adjustable. That is to say, the pitch of the rotor blades 18 can be adjusted in accordance with a collective pitch setting, where each rotor blade 18 is set to the same pitch value relating to the collective pitch setting. In addition to that, the rotor blades 18 are adjustable in accordance with individual pitch settings, where each rotor blade 18 may be set to its own pitch value corresponding to its individual pitch setting.

Figure 2:
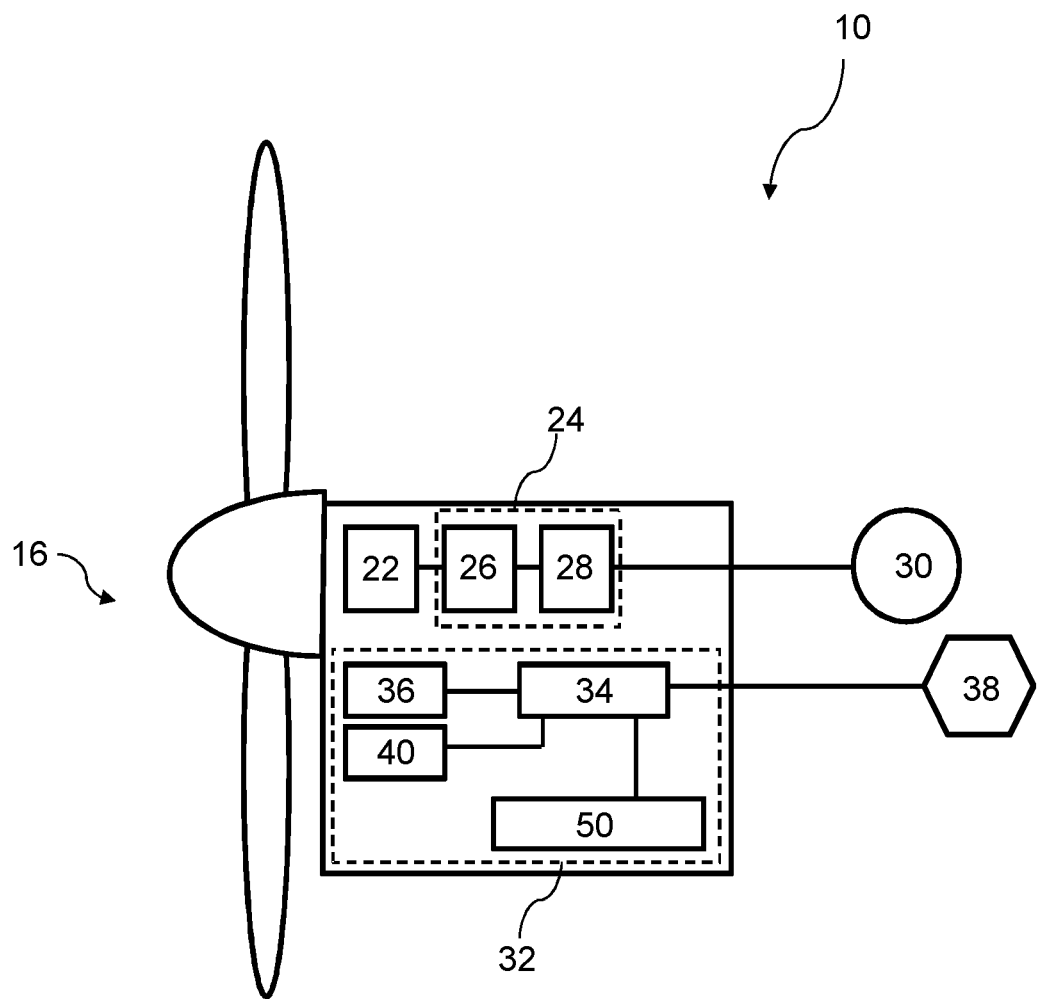
FIG. 2 is a schematic systems view of the wind turbine in FIG. 1.

With reference to FIG. 2, which is a schematic illustration of the wind turbine 10 at a systems level, the wind turbine 10 further comprises a gearbox 22 and a power generation system 24 including a generator 26 and a power converter system 28. The gearbox 22 gears up the rotational speed of the rotor 16 and drives the generator 26, which in turn feeds generated power to the power converter system 28. Usually such a system will be based on three-phase electrical power, although this is not essential. Other wind turbine designs are known, such as "gearless" types, also known as "direct drive", as well as "belt drive" transmission types.

The generator 26 and the power converter system 28 may, as an example, be based on a full-scale converter (FSC) architecture or a doubly-fed induction generator (DFIG) architecture, although other architectures would be known to the skilled person.

In the illustrated embodiment, the power output of the power converter system 28 is transmitted to a load 30, which may be an electrical grid. The skilled person would be aware that different power conversion and transmission options exist.

The wind turbine 10 further comprises a control means 32 that is operable to monitor the operation of the wind turbine 10 and to issue commands thereto to achieve a set of control objectives. The control means 32 is shown in FIG. 2 as a simplified, schematic overview of a plurality of control units and modules, and also in FIG. 3, as a more detailed example of how specific units and modules may be arranged in order to facilitate data exchange between them.

The control means 32 comprises a processor 34 configured to execute instructions that are stored in and read from a memory module 36 and/or an external data store that forms part of an external network 38. Measurement data may also be stored in the memory module 36, and recalled in order to execute processes according to the instructions being carried out by the processor 34.

Instructions and data may also be received from external controllers or sensors that form part of the external network 38, and recorded data and/or alerts may be issued over the external network 38 to be stored/displayed at an external source for analysis and remote monitoring.

In addition, the processor 34 is in communication with a plurality of sensors 40 that are disposed within the wind turbine 10. For example, as shown in FIG. 3, the plurality of sensors 40 may comprise a tower accelerometer 42, a rotor speed sensor 44, a blade pitch angle sensor 46, a nacelle yaw angle sensor 48, and a wind speed sensor 49.

The control means 32 of the wind turbine 10 also includes at least one control unit 50.

Figure 3:
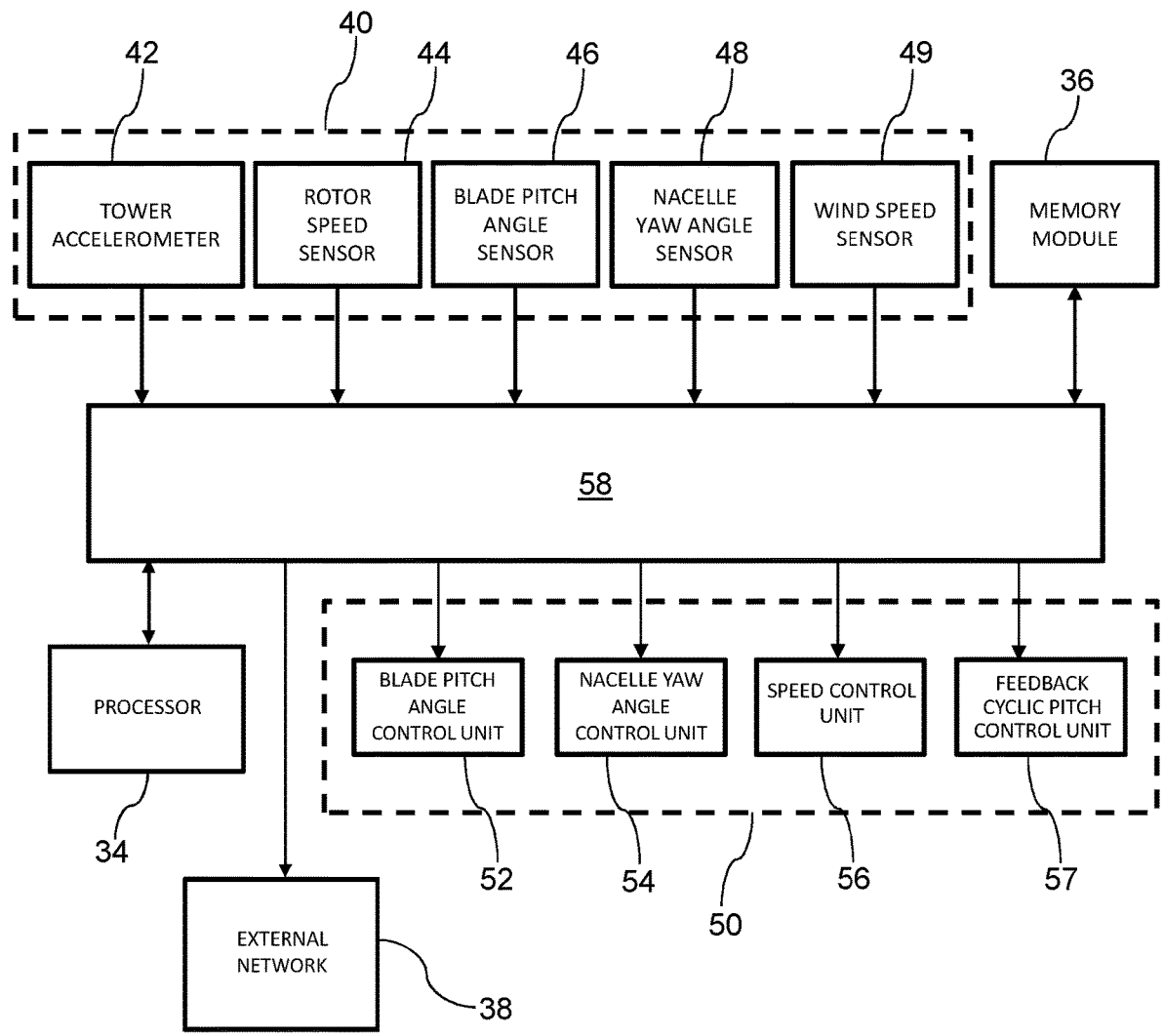
FIG. 3 is a detailed schematic systems view of a monitoring and control system of the wind turbine system of FIG. 2.

Four control units are shown in the configuration shown in FIG. 3. These are a blade pitch angle control unit 52, a nacelle yaw angle control unit 54, a speed control unit 56 and a feedback cyclic pitch control unit 57. The blade pitch angle control unit 52 and the nacelle yaw angle control unit 54 are arranged to alter the pitch angle of the rotor blades 18 and the yaw angle of the nacelle 14 respectively. The speed control unit 56 functions to control the rotational speed of the rotor 16 through converter control and pitch control. The function of the feedback cyclic pitch control unit 57 (hereinafter "the cyclic pitch control unit 57") is discussed below. In the embodiment shown, the blade pitch angle control unit 52 and the cyclic pitch control unit 57 are separate control units. However, the skilled reader will appreciate that the respective functionalities of these separate control units 52, 57 could be delivered from a single control unit.

A network 58 forms a central connection between each of the modules (according to a suitable protocol), allowing the relevant commands and data to be exchanged between each of the modules accordingly. However, it will be appreciated that suitable cabling may be provided to interconnect the units. It will also be appreciated that the wind turbine 10 could include more control units 50, and that FIG. 3 is provided only to illustrate an example of a system architecture in which the invention may be implemented.

A principal function of the control means 32 is to control power generation of the wind turbine 10 so that it optimises power production under current ambient wind conditions and in accordance with demanded power generation by a transmission grid operator. However, in addition to its main power control tasks, the control means 32 may be operable to perform a suite of safety and diagnostic monitoring functions, and carry out corrective action, if necessary. In the embodiments of the invention, one of these functions is to prevent any exciting forces of the rotor 16 from resonating with the bending frequencies of the tower 12. A rotor can experience exciting forces with its rotational frequency from asymmetries or imbalances in the rotor. For example, asymmetries in the rotor may come about due to geometric errors in or misalignment of the rotor blades, giving rise to aerodynamic asymmetries. Any mass imbalances in the rotor 16 will also give rise to exciting rotor forces.

Figure 4A:
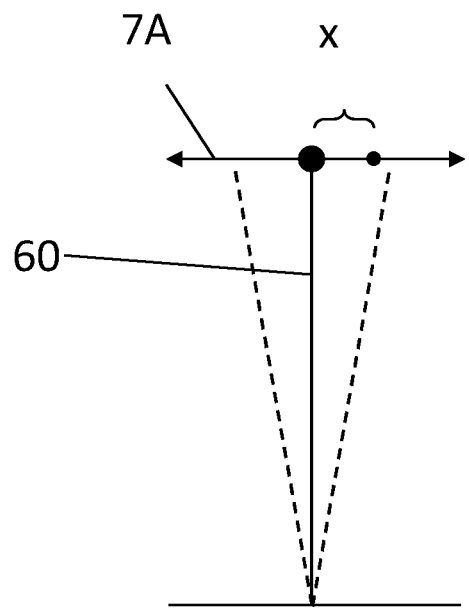
FIG. 4 is a schematic view of a lateral vibrational movement (FIG. 4A) and a torsional vibrational movement (FIG. 4B) of the wind turbine in FIG. 1.
Figure 4B:
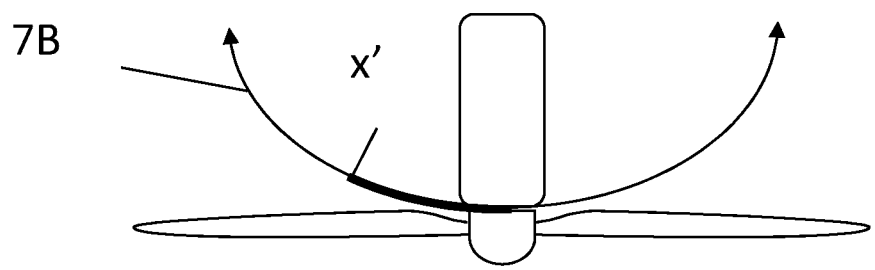

In general, due to the vibrational coupling between the rotor 16 and the tower 12, such exciting rotor forces can bring about at least two vibrational modes in the tower 12, one in a lateral direction and another in a torsional direction. A third vibrational mode can give rise to a vibration in the fore-aft directions. A vibration in a lateral direction is sometimes referred to as a side-side vibration. Aspects of this vibration is schematically illustrated in FIG. 4A. In this figure, the turbine 10 is illustrated by a tower structure 60, which is fixed at its lower end and provided with a mass at its free end. When the top of the tower structure 60 vibrates in the lateral direction 7A, the position, x, varies between two maxima defined by the maximum deflection of the tower structure 60 during the vibration. The position, x, is representative of the position of the nacelle 14 in a direction defined by the lateral movement of the tower structure 60. The position, x, may indicate the position of the nacelle's 14 centre-of-mass, the position of a sensor housed within the nacelle 14, or the position of other fix-points representing the movement of the nacelle 14 in the lateral direction. In addition to the lateral vibration, the wind turbine 10 may also experience a vibration along a torsional direction 7B, as illustrated in FIG. 4B. Such vibration is often referred to as a torsional vibration. In this regard, torsional direction should be understood as movement along a path defined by an arc sector or semi-circular sector as shown in FIG. 4B. When the top of the tower 12 vibrates in the torsional direction 7B, the position, x', characteristic of the position of the nacelle 14 in the torsional direction, varies between two maxima defined by the maximum twist experienced by the tower 12 during the torsional vibration. An accelerometer or gyroscope could be used to determine the movement of the nacelle 14. In such an embodiment, the accelerometer or gyroscope could be placed at one end of the nacelle 14. In this regard, it may not be necessary to detect directly the movement in the torsional direction 7B. Instead, an indirect detection of the movement may be used, provided that the indirect movement correlates with the movement in the torsional direction 7B. This may be obtained by using an accelerometer that detects movement in the lateral direction 7A, in combination with further information to determine that the movement also relates to a torsional vibration. Such further information may relate to the frequency of the vibration.

In practice, lateral and torsional vibrations are not distinct vibrational modes. That is to say, a lateral vibration may also cause a torsional vibration, and vice versa.

In an embodiment of the invention, the exciting forces experienced by the rotor 16 are compensated for, generally speaking, by determining pitch signals for individually adjusting the pitch of the pitch-adjustable rotor blades 18 to provide a force that dampens the movement of the nacelle 14, and so the tower 12. The cyclic pitch control unit 57 is configured to carry out this function and generally provides a closed-loop system in which the motion of the tower 12 is fed back to the pitch signals for determining the individual pitch settings. The blade pitch angle control unit 52 then applies the resulting pitch signals to the pitch-adjustable rotor blades 18.

Figure 5:
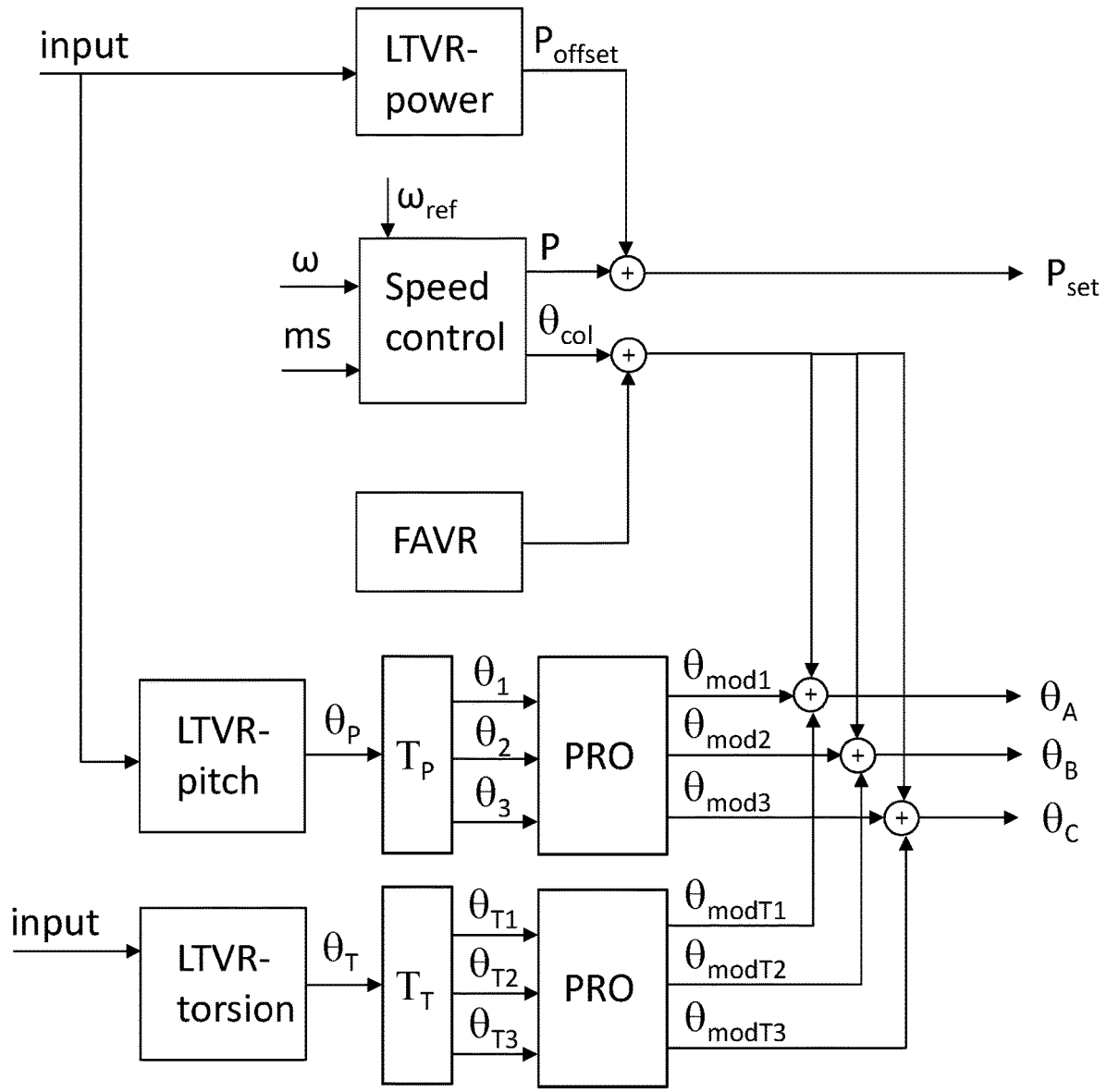
FIG. 5 is a schematic view of a control scheme of an embodiment of the invention.

FIG. 5 is a detailed illustration of an embodiment of the cyclic pitch control unit 57. In one implementation, the cyclic pitch control unit 57 minimises a speed error ($\omega - \omega_{ref}$) between the generator 26 speed ($\omega$) and a reference speed ($\omega_{ref}$) in order to output a requested power or power reference (P), and a collective pitch reference ($\theta_{col}$). The cyclic pitch control unit 57 may be implemented by a PI, PID or similar control schemes.

Figure 6:
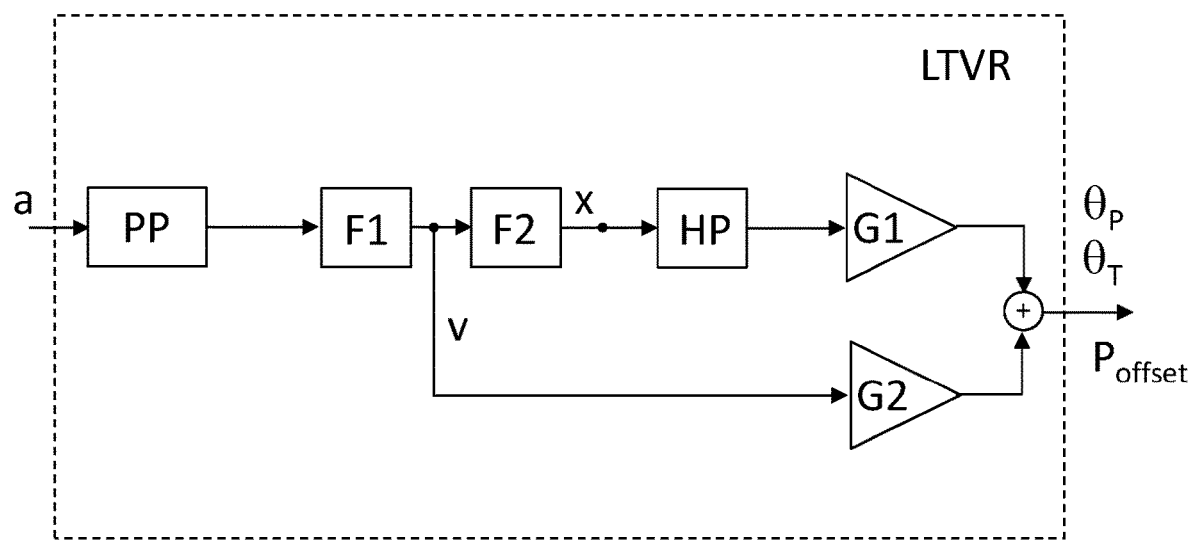
FIG. 6 is a schematic view of an embodiment of a lateral tower vibration reduction block for use in the control scheme of FIG. 5.

FIG. 5 illustrates a number of vibration reducing control blocks. A block is illustrated which shows the lateral tower vibration reduction by using the pitch (LTVR-pitch), where pitch actuation signals for reducing lateral tower vibrations are determined based on a first signal and optionally a second signal. Embodiments of the first and second signals are illustrated in FIG. 6.

The LVRT-pitch control block determines an actuator signal ($\theta_P$) which is transformed in a transformation unit ($T_P$) to pitch reference offset signals ($\theta_1, \theta_2, \theta_3$) for each of the rotor blades 18 so that resulting pitch signals ($\theta_A, \theta_B, \theta_C$) can be applied to the pitch-adjustable rotor blades 18 individually. The pitch reference offset signals ($\theta_1, \theta_2, \theta_3$) are modified in a pitch reference offset control block (PRO) to obtain modified pitch reference offset signals ($\theta_{mod1}, \theta_{mod2}, \theta_{mod3}$). Each individual pitch signal ($\theta_A, \theta_B, \theta_C$) is based on the modified pitch reference offset signals ($\theta_{mod1}, \theta_{mod2}, \theta_{mod3}$), and thereby on a combined signal of the collective pitch reference ($\theta_{col}$) and the first signal, or a combined signal of the collective pitch reference ($\theta_{col}$) and the first signal and the second signal as determined by the LTVR-pitch block.

The LTVR-pitch block determines a signal representing a desired force or torque in the direction of the movement of the nacelle 14. The transformation is to obtain resulting pitch contributions ($\theta_1, \theta_2, \theta_3$) for each of the pitch-adjustable rotor blades 18.

The transformation ($T_P$) may be based on a multi-blade coordinate transformation of the Coleman transformation or Fourier coordinate transformation type, which is arranged to take a signal in a non-rotating reference frame, that is, the actuator signal ($\theta_P$), and transform it to a resulting signal in the rotating frame, the pitch reference offset signals ($\theta_1, \theta_2, \theta_3$).

As an addition or as an alternative, the lateral tower vibration may also be reduced by using the power as actuator (LTVR-power), where a power actuation signal for reducing lateral tower vibrations by use of the power reference is being determined based on the first signal and optionally the second signal.

The LVRT-power control block determine a power reference offset ($P_{offset}$) to be combined with the power reference (P) to provide a resulting power reference signal ($P_{set}$). The resulting power reference signal ($P_{set}$) is determined based on a combined signal of the power reference (P) and the actuator signal ($P_{offset}$), and thereby on the first signal, or a combined signal of the power reference (P) and the first signal and the second signal. The resulting power reference signal ($P_{set}$) is applied to the electrical generator 26. Embodiments of the first and second signals are illustrated in FIG. 6.

As an addition or as an alternative, also the torsional tower vibration may also be reduced by using the pitch as actuator (LTVR-torsion), where pitch actuation signals for reducing torsion tower vibrations is being determined based on the first signal and optionally the second signal.

The LVRT-torsion control block determines an actuator signal ($\theta_T$) which is transformed in a transformation unit ($T_T$) to pitch reference offset signals ($\theta_{T1}, \theta_{T2}, \theta_{T3}$) for each of the rotor blades 18 so that resulting pitch signals ($\theta_A, \theta_B, \theta_C$) can be applied to the pitch-adjustable rotor blades 18 individually. The pitch reference offset signals ($\theta_{T1}, \theta_{T2}, \theta_{T3}$) are modified in the pitch reference offset control block (PRO) to obtain modified pitch reference offset signals ($\theta_{modT1}, \theta_{modT2}, \theta_{modT3}$). Each individual blade actuation signal ($\theta_A, \theta_B, \theta_C$) being based on the modified pitch reference offset signals ($\theta_{modT1}, \theta_{modT2}, \theta_{modT3}$), and thereby on a combined signal of the collective pitch reference ($\theta_{col}$) and the first signal, or a combined signal of the collective pitch reference ($\theta_{col}$) and the first signal and the second signal as determined by the LTVR-torsion block. Embodiments of the first and second signals are illustrated in FIG. 6.

The LTVR-torsion block corresponds to the LTVR-pitch block, and the transformation ($T_T$) is similar to the transformation ($T_P$), except that the specific implementation is made for torsional movement.

Moreover, vibration reduction in the fore-aft direction may also be target by imposing a vibration reduction pitch offset signal onto the collective pitch reference ($\theta_{col}$). This pitch offset signal may be determined in a fore-aft vibration reduction block (FAVR), to provide a reduction of the vibration, or damping of the nacelle movement, in the fore-aft direction.

The collective pitch reference ($\theta_{col}$) is determined by a speed controller in view of the rotor speed and optionally also further sensor values, referred to in FIG. 5 as a measurement set. (ms).

FIG. 6 illustrates an embodiment of a lateral tower vibration reduction block (LTVR). In this regard it is understood that the tower vibration reduction blocks relating to power, pitch and torsion as illustrated in FIG. 5 could all be implemented according to this general scheme. However, the specific implementation would differ for the different actuation types. In particular the various filters and gains would be adapted to the specific actuation block or actuation type.

In FIG. 6, a signal (a), indicative of a vibrational movement of the tower 12, is used as an input. In this embodiment, the signal (a) is an accelerometer signal obtained by an accelerometer suitably positioned to measure the acceleration of the movement of the nacelle 14 in a relevant direction.

The acceleration signal (a) may be used as a raw signal however, typically the signal is pre-processed, as indicated by "PP" in the figure. Such pre-processing may be the application of an anti-aliasing filter to remove any high frequency content that is not needed for further use. Other filters, including other band-pass filters, may be applied during the pre-processing.

The acceleration signal (a), or the pre-processed version of the signal, is further processed by the application of a series of filters. In the illustrated embodiment, an estimated position signal (x or x'), indicative of a positon of the top of the tower 12 in the relevant direction is obtained by applying in series a first integration (F1) of the acceleration signal to obtain an estimated velocity signal (v or v'), and a second integration (F2) of the estimated velocity signal to obtain the estimated position signal (x or x'). In this case, the estimated velocity signal (v or v') is indicative of a velocity of the top of the tower 12 during the vibrational movement of the tower 12. In general, any suitable filters which integrate the input signal can be applied. In an embodiment, the first and second integrations may be implemented as leaky integrators. The leaky integrators can be implemented as $1^{st}$ order low pass filters tuned with a break frequency below the $1^{st}$ for-aft mode frequency, the frequency being the system frequency comprising the tower 12, rotor 16, nacelle 14, and, optionally, also a foundation.

The first signal to the actuator capable of reducing the nacelle 14 vibration in the relevant direction (pitch or power) may be determined as the estimated position signal (x) multiplied with a first gain (G1).

In an embodiment, the speed signal indicative of a speed of a movement of the top of the tower 12 in the relevant direction may be obtained as the estimated velocity signal (v) which results after the first integration (F1).

The second signal may be determined as the estimated velocity signal (v) multiplied with a second gain (G2).

In this embodiment, the resulting signal is sum of the first (position) and second (velocity) signals. As described, the invention may in an embodiment implemented using the first signal only. In such an embodiment, this may be obtained by setting the second gain (G2) to zero.

In a further embodiment, also illustrated in FIG. 6, the position signal is high-pass filtered (HP) prior to determining the first signal.

The adjustment gain is applied to the first signal (G1), and optionally the second signal (G2), in order to gain adjust the first signal, and optionally the second signal, prior to applying the pitch signals ($\theta_A$, $\theta_B$, $\theta_C$) to an actuator of the wind turbine 10 capable of reducing nacelle 14 vibration in the direction of the movement of the nacelle 14. In this regard, the tower vibration frequency of a tower vibration eigenmode or a first natural bending frequency is determined, and a rotor frequency corresponding to the rotor speed is determined. Based on these values, the adjustment gain is determined by a separation between the rotor frequency and tower vibration frequency.

The adjustment gains (G1, G2) are set to zero for rotor frequencies below and above predetermined thresholds below and above the $1^{st}$ eigenmode respectively. The adjustment gains (G1, G2) then increase as the rotor frequencies cross the thresholds and approach the $1^{st}$ eigenmode. In this embodiment, the increasing adjustment gain may be a piecewise linear function. However, this function may be defined in accordance with any function with a functional dependency upon the rotor speed which express that the adjustment gains (G1, G2) are determined by a separation between the excitation frequency and tower vibration frequency.

In embodiments, the separation between the excitation frequency and tower vibration frequency is based on a difference between the excitation frequency and tower vibration frequency or on a ratio between the excitation frequency and tower vibration frequency.

In an embodiment, the adjustment gains (G1, G2) may be gain scheduled by including into the adjustment gain a gain scheduling term being dependent upon an operational point of the wind turbine 10. For example, the gain adjustment term may be multiplied by a factor which increases with increasing acceleration in the lateral direction.

Figure 7:
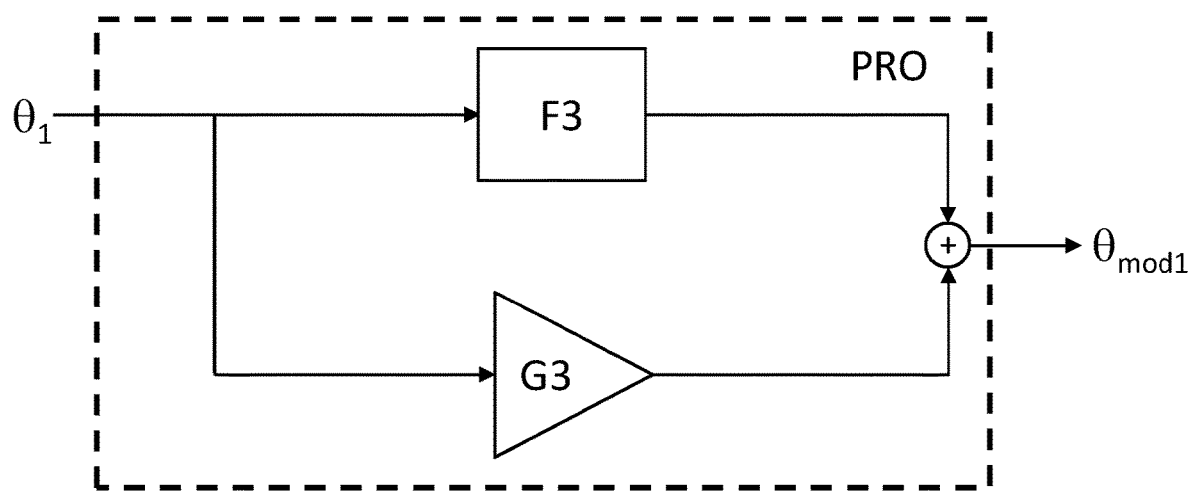
FIG. 7 is a schematic view of an embodiment of a pitch reference offset control block for use in the control scheme of FIG. 5; and, FIG. 8 is a graph illustrating the comparative effect of using the pitch reference offset control block of FIG. 7.

FIG. 7 illustrates an embodiment of the pitch reference offset control block (PRO) of FIG. 5, which may be implemented by an integral or a PI type control scheme. Here, a pitch reference offset signal, for example ($\theta_1$), is used as input, although in practice all of the pitch reference offset signals ($\theta_1$, $\theta_2$, $\theta_3$, $\theta_{T1}$, $\theta_{T2}$, $\theta_{T3}$) are used as inputs. The pitch reference offset signal is then modified by applying in series a third integration (F3) of the pitch reference offset signal ($\theta_1$) to obtain a corresponding modified pitch reference offset signal ($\theta_{mod1}$). In an embodiment, the third integration (F3) may be implemented as a leaky integrator. The leaky integrator can be implemented as $1^{st}$ order low pass filter tuned with a break frequency considerably lower than the first natural bending frequency of the tower 12. For example, the break frequency may be 0.01 Hz. Alternatively, the modified pitch reference offset signal ($\theta_{mod1}$) may be determined as a sum of the integrated pitch reference offset signal and a gain adjusted pitch reference offset signal ($\theta_1$). In this case, the pitch reference offset signal ($\theta_1$) is multiplied with a third gain (G3), and the gain adjusted pitch reference offset signal is added to the integrated pitch reference offset signal to determine the modified pitch reference offset signal ($\theta_{mod1}$). In an embodiment, the modified pitch reference offset signal ($\theta_{mod1}$) is at unity gain. The embodiment of the pitch reference offset control block (PRO) that is implemented using only an integral control scheme may be obtained by setting the third gain (G3) to zero.

The impact of any asymmetries and/or mass imbalances in the rotor 16 can be represented as an external force disturbance ($d_X$) acting on the top of the tower 12 as the rotor 16 rotates. The amplitude and phase of the disturbance ($d_X$) are determined from the magnitude of the asymmetries and mass imbalances. Assuming that the speed or frequency ($\omega_r$) of the rotor 16 is constant, the disturbance ($d_X$) appears as a sinusoidal 1P disturbance. That is to say, the frequency of excitation of the rotor 16 due to the disturbance occurs once per revolution of the rotor 16.

The response of the cyclic pitch control unit 57 to any asymmetries and/or mass imbalances in the rotor 16 can be evaluated as a transfer function from the disturbance ($d_X$), as an input, to the velocity ($v_X$) of the top of the tower 12 at the frequency ($\omega_r$) of the rotor 16, as an output. Considering the transfer function as a sensitivity function, a performance metric can be formulated as follows:

$$|S(j\omega_r)| \equiv \frac{v_X(j\omega_r)}{d_X(j\omega_r)}$$

Figure 8:
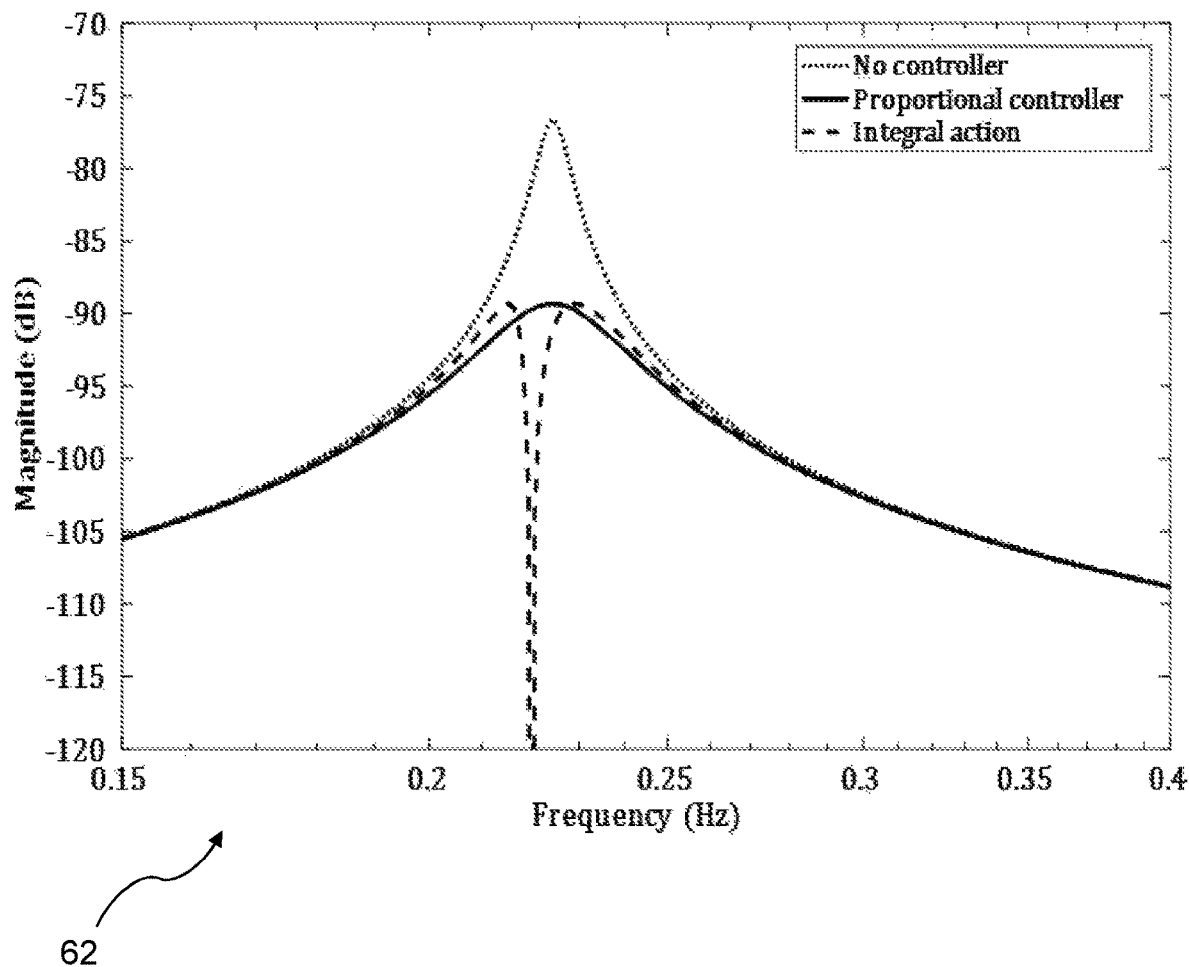

FIG. 8 shows a graph 62 illustrating the effect of applying a third integration (F3) of the pitch reference offset signals ($\theta_1$, $\theta_2$, $\theta_3$, $\theta_{T1}$, $\theta_{T2}$, $\theta_{T3}$) on damping the external force disturbance ($d_X$) acting on the top of the tower 12. The graph 62 shows the sensitivity function, $S(j\omega_r)$, plotted against frequency (Hz) in the x-axis and magnitude (dB) in the y-axis, for three different wind turbines, namely: i) a wind turbine with no control unit for damping the effect of the disturbance: ii) a wind turbine with a control unit comprising only a proportional control scheme for damping the effect of the disturbance; and, iii) a wind turbine with a control unit comprising an integral control scheme for damping the effect of the disturbance. The graph 62 illustrates a situation in which the rotor frequency and the first natural bending frequency of the tower substantially coincide. Specifically, in this example, the rotor frequency ($\omega_r$) is 0.22 Hz and the first natural bending frequency of the tower is 0.2244 Hz. If this situation is left unchecked, as illustrated by the wind turbine with no control unit, the disturbance acting on the top of the tower 12 from any asymmetries and/or mass imbalances in the rotor 16 will cause a high amplitude oscillation of the tower 12. Such an oscillation can lead to significant damage of the tower 12, the rotor 16, the nacelle 14 and components thereof. It can be seen from the graph 62 that this oscillation can be generally damped using a control unit comprising a proportional control scheme, although significant movement of the top of the tower 12 is still observed at the first bending frequency of the tower 12. However, the graph 62 shows that infinite damping can be obtained using an integral control scheme. The reason is that the third integration (F3) has infinite gain at zero frequency. In the complex-frequency plane, an integrator corresponds to a pole at zero. A pole at zero in a system experiencing a sinusoidal 1P disturbance will show up as two poles at +/−j1P in a fixed close-loop system. Accordingly, two zeros are present in the fixed closed-loop system at +/−j1P, which correspond to infinite damping at frequencies equal to 1P. As a rotor imbalance can be modelled as a cyclic, sideways force disturbance acting at the rotor frequency, integral action thus provides an extremely simple, yet powerful means of compensating rotor imbalances, whether it is pitch asymmetries or mass imbalance. This, in turn, reduces dramatically the amount of tower excitation at the rotor frequency, allowing significant relaxation and possibly elimination of the frequency constraint imposed on present-day tower designs. This relaxation also brings increased flexibility when configuring turbine operation, allowing optimized noise modes where rotor speed can be chosen with no concern about the rotor speed coinciding with the tower resonance frequency.

It will be appreciated by those skilled in the art that the invention has been described by way of example only, and that a variety of alternative approaches may be adopted without departing from the scope of the invention, as defined by the appended claims.

The invention claimed is:

1. A method of controlling a wind turbine comprising a tower supporting a rotor comprising a plurality of pitch-adjustable rotor blades, the method comprising:
obtaining a movement signal indicative of a vibrational movement of the tower;
determining an actuator signal based on the movement signal, the actuator signal being determined to produce a desired force to counteract the vibrational movement of the tower;
determining a pitch reference offset signal for each one of the plurality of pitch-adjustable rotor blades based on the actuator signal;
applying an integration of the pitch reference offset signals;
determining modified pitch reference offset signals based on the integrated pitch reference offset signals;
determining a pitch signal for each one of the plurality of pitch-adjustable rotor blades based on the modified pitch reference offset signals; and
adjusting a pitch of the plurality of pitch-adjustable rotor blades based on the respective determined pitch signals.

2. The method of claim 1, further comprising applying an adjustment gain to the pitch reference offset signals and determining the modified pitch reference offset signals based on the integrated pitch reference offset signals and the gain adjusted pitch reference offset signals.

3. The method of claim 1, wherein the actuator signal is determined in a non-rotating reference frame, the method further comprising:
transforming the actuator signal from the non-rotating reference frame to a rotating reference frame to determine the pitch reference offset signals.

4. The method of claim 1, further comprising:
determining a collective pitch reference signal for the plurality of pitch-adjustable rotor blades, the collective pitch reference signal being determined based on a rotor speed, wherein the pitch signals are determined based on a combined signal of the modified pitch reference offset signals and the collective pitch reference signal.

5. The method of claim 4, wherein the collective pitch reference signal, is determined by feedback control based on minimizing a speed error between the rotor speed and a reference rotor speed.

6. The method of claim 1, further comprising:
determining an excitation frequency affecting the tower, wherein an adjustment gain is defined by a separation between the excitation frequency and a tower vibration frequency.

7. The method of claim 1, wherein an adjustment gain further comprises a gain scheduling term, the gain scheduling term being dependent on an operational point of the wind turbine.

8. The method of claim 1, wherein a direction of the vibrational movement of the tower is a lateral direction or a torsional direction.

9. The method of claim 1, further comprising:
obtaining a position signal based on the movement signal, the position signal indicative of a position of a top of the tower during the vibrational movement of the tower;
determining a first signal based on the position signal;
applying an adjustment gain to the first signal; and
determining the actuator signal based on the gain adjusted first signal.

10. The method of claim 9, further comprising:
obtaining a velocity signal based on the movement signal, the velocity signal indicative of a velocity of the top of the tower during the vibrational movement of the tower;
applying a second adjustment gain to the velocity signal; and
determining the actuator signal based on the gain adjusted first signal and the gain adjusted velocity signal.

11. The method of claim 10, wherein the movement signal comprises an acceleration signal, the method further comprising:
obtaining the velocity signal as an estimated velocity signal by applying a first integration of the acceleration signal; and,
obtaining the position signal as an estimated position signal by applying a second integration of the velocity signal.

12. A controller for a wind turbine control system comprising a processor and a memory module, wherein the memory module comprises a set of program code instructions which when executed by the processor implement an operation for controlling a wind turbine comprising a tower supporting a rotor comprising a plurality of pitch-adjustable rotor blades, the operation comprising:
obtaining a movement signal indicative of a vibrational movement of the tower;
determining an actuator signal based on the movement signal, the actuator signal being determined to produce a desired force to counteract the vibrational movement of the tower;
determining a pitch reference offset signal for each one of the plurality of pitch-adjustable rotor blades based on the actuator signal;
applying an integration of the pitch reference offset signals;
determining modified pitch reference offset signals based on the integrated pitch reference offset signals;
determining a pitch signal for each one of the plurality of pitch-adjustable rotor blades based on the modified pitch reference offset signals; and
adjusting a pitch of the plurality of pitch-adjustable rotor blades based on the respective determined pitch signals.

13. A computer program product downloadable from a communication network and/or stored on a machine readable medium comprising program code instructions for implementing an operation, comprising:
obtaining a movement signal indicative of a vibrational movement of a tower comprising a rotor with a plurality of pitch-adjustable rotor blades;
determining an actuator signal based on the movement signal, the actuator signal being determined to produce a desired force to counteract the vibrational movement of the tower;
determining a pitch reference offset signal for each one of the plurality of pitch-adjustable rotor blades based on the actuator signal;
applying an integration of the pitch reference offset signals;
determining modified pitch reference offset signals based on the integrated pitch reference offset signals; and
determining a pitch signal for each one of the plurality of pitch-adjustable rotor blades based on the modified pitch reference offset signals; and
adjusting a pitch of the plurality of pitch-adjustable rotor blades based on the respective determined pitch signals.

14. A wind turbine, comprising:
a tower;
a nacelle disposed on the tower;
a rotor extending from the nacelle and comprising a plurality of pitch-adjustable rotor blades; and
a controller configured to perform an operation, comprising:
obtaining a movement signal indicative of a vibrational movement of the tower;
determining an actuator signal based on the movement signal, the actuator signal being determined to produce a desired force to counteract the vibrational movement of the tower;
determining a pitch reference offset signal for each one of the plurality of pitch-adjustable rotor blades based on the actuator signal;
applying an integration of the pitch reference offset signals;
determining modified pitch reference offset signals based on the integrated pitch reference offset signals;
determining a pitch signal for each one of the plurality of pitch-adjustable rotor blades based on the modified pitch reference offset signals; and
adjusting a pitch of the plurality of pitch-adjustable rotor blades based on the respective determined pitch signals.

* * * * *